(12) United States Patent
Sokolov et al.

(10) Patent No.: US 8,923,595 B2
(45) Date of Patent: Dec. 30, 2014

(54) METHOD OF IDENTIFICATION OF CANCEROUS AND NORMAL CELLS

(75) Inventors: Igor Sokolov, Potsdam, NY (US); Maxim Dokukin, Potsdam, NY (US)

(73) Assignee: Clarkson University, Potsdam, NY (US)

(*) Notice: Subject to any disclaimer, the term of this patent is extended or adjusted under 35 U.S.C. 154(b) by 455 days.

(21) Appl. No.: 13/013,209

(22) Filed: Jan. 25, 2011

(65) Prior Publication Data

US 2011/0182494 A1    Jul. 28, 2011

Related U.S. Application Data

(60) Provisional application No. 61/282,340, filed on Jan. 26, 2010.

(51) Int. Cl.
| | | |
|---|---|---|
| *G06K 9/00* | (2006.01) | |
| *G01Q 60/24* | (2010.01) | |
| *G01Q 60/28* | (2010.01) | |
| *G01Q 60/34* | (2010.01) | |
| *G01Q 30/04* | (2010.01) | |
| *B82Y 35/00* | (2011.01) | |

(52) U.S. Cl.
CPC ............ *G06K 9/00127* (2013.01); *G01Q 30/04* (2013.01); *B82Y 35/00* (2013.01)
USPC ........... 382/133; 382/128; 382/134; 382/181; 436/518; 436/521; 435/40.5; 435/260

(58) Field of Classification Search
CPC ....... G01Q 60/24; G01Q 60/28; G01Q 60/34; G01Q 60/363; G06T 2207/30096; G06T 2207/30024; G06T 2207/30088; C01P 2004/04; G06K 9/00127
USPC .......... 382/133, 128, 134, 181; 436/518, 521; 435/40.5, 260
See application file for complete search history.

(56) References Cited

U.S. PATENT DOCUMENTS

| | | | | |
|---|---|---|---|---|
| 6,357,285 | B1* | 3/2002 | Allen ............................. | 73/105 |
| 6,818,891 | B1* | 11/2004 | Hough et al. ..................... | 850/3 |
| 7,089,787 | B2* | 8/2006 | Sahin et al. ..................... | 73/105 |
| 2004/0137551 | A1 | 7/2004 | Markovic et al. | |
| 2005/0239047 | A1* | 10/2005 | Gimzewski et al. ............. | 435/4 |
| 2010/0105104 | A1* | 4/2010 | Okano et al. .................. | 435/40.5 |
| 2010/0122385 | A1* | 5/2010 | Hu et al. ............................ | 850/5 |
| 2011/0070604 | A1* | 3/2011 | Gimzewski et al. ............ | 435/29 |
| 2011/0167524 | A1* | 7/2011 | Hu et al. ............................ | 850/1 |

OTHER PUBLICATIONS

Bora, et al. "Multiscale roughness and modeling of MEMS interfaces." Tribology Letters. 9.1 (20085): 37-48. Print.*
Cross, et al. "AFM-based analysis of human metastatic cancer cells." Nanotechnology. 19. (2008): 1-8. Print.*

(Continued)

*Primary Examiner* — Michael A Newman
(74) *Attorney, Agent, or Firm* — George R. McGuire; Blaine T. Bettinger; Bond Schoeneck & King, PLLC

(57) ABSTRACT

A method is described for distinguishing between cancerous and normal human cells. The method includes collecting cells; preparing cells for scanning; scanning of the prepared cells by means of atomic force microscopy; processing of the obtained images through specific algorithms; wherein the algorithms allowing one to identify whether the cell is cancerous or normal.

38 Claims, 10 Drawing Sheets

(56) References Cited

OTHER PUBLICATIONS

Cross et al. "AFM-based analysis of human metastatic cancer cells." Nanotechnology. 19. (2008): 1-8. Print.*

Bora et al. "Multiscale roughness and modeling of MEMS interfaces." Tribology Letters. 9.1 (20085): 37-48. Print.*

Bauer, et al. "Cancer Detection on a Cell-by-Cell Basis Using a Fractal Dimension Analysis." APH N.S., Heavy Ion Physics. 14. (2001): 43-50. Print.*

Pelling, Andrew E. et al, Nanoscale Visualization and Characterization of Myxococcus Xanthus Cells With Atomic Force Microscopy, Proc Natl Acad Sci USA, vol. 102, No. 18, pp. 6484-6489, May 3, 2005.

Suresh, Subra, Biomechanics and Biophysics of Cancer Cells, Acta Biomater, 3, pp. 413-438, Jul. 2007.

Sokolov, Igor, Atomic Force Microscopy in Cancer Cell Research, Cancer Nanotechnology, pp. 1-17, 2007.

Binning, G. et al, Atomic Force Microscope, Physical Review Letters, vol. 56, No. 9, pp. 930-933, Mar. 3, 1986.

Matzke, Rainer et al, Direct, High-Resolution Measurement of Furrow Stiffening During Division of Adherent Cells, Nature Cell Biology, vol. 3, pp. 607-610, Jun. 2001.

Sokolov, Igor et al, Detection of Surface Brush on Biological Cells in Vitro With Atomic Force Microscopy, Applied Physics Letters, 91, 023902-1, 2007.

Iyer, Swaminathan et al, Towards Nonspecific Detection of Malignant Cervical Cells With Fluorescent Silica Beads, Small, 5, No. 20, pp. 2277-2284, 2009.

Iyer, S et al, Atomic Force Microscopy Detects Differences in the Surface Brush of Normal and Cancerous Cells, Nature Nanotechnology, vol. 4, pp. 389-393, Jun. 2009.

Sahin, Ozgur et al, An Atomic Force Microscope Tip Designated to Measure Time-Varying Nanomechanical Forces, Nature Nanotechnology, vol. 2, pp. 507-514, Aug. 2007.

Lekka, M. et al, The Effect of Chitosan on Stiffness and Glycolytic Activity of Human Bladder Cells, Biochimica et Biophysica Acta, 1540, pp. 127-136, 2001.

* cited by examiner

METHOD OF IDENTIFICATION OF CANCEROUS AND NORMAL CELLS

CROSS-REFERENCE TO RELATED APPLICATIONS

The present application claims priority to U.S. Provisional Patent Application No. 61/282,340, filed on Jan. 26, 2010, and entitled "A Method of Identification of Human Cancerous Cells," the content of which is relied upon and incorporated herein by reference in its entirety.

BACKGROUND OF THE INVENTION

1. Field of the Invention

The present invention relates to a method to identify whether a cell is cancerous or normal.

2. Description of the Related Art

Humans are still far from conquering cancer. Traditional biochemical methods seem to run out of steam. There is a hope that the achievements of modern nanotechnology, physical sciences may bring novel alternative methods to attack on cancer. The challenges for scientists working in the area of cancer are often multidisciplinary in nature. Recent advances in this field are a result of inter-disciplinary research involving physics, chemistry, molecular biology, engineering and medicine. Research efforts over the years have resulted in the development of DNA chips, miniaturized biosensors and bioMEMS. These smart microsystems have found applications in gene expression profiling, drug delivery and clinical diagnostics. In particular, the development of highly sensitive probes for detection of cancer has attracted considerable attention in biology and medical research fields.

As an example, cervical cancer is the second leading cancer in women worldwide and infection with high risk human papillomavirus ("HPV") is the most significant risk factor in its etiology. HPV causes a common sexually transmitted infection among both women and men. The objective of screening for cervical cancer is to prevent persistent HPV infection and death by detecting and treating high-grade squamous intraepithelial lesions, which are precursor lesions for invasive cancer. A simple and effective screening method is of prime and utmost importance especially in many developing countries where cervical cancer rates are particularly high. In the United States, an estimated 12,900 cases of cervical cancer and 4,400 deaths occur annually.

The Papanicolaou ("Pap") smear test has proven to one of the most successful methods of cancer detection over the years. Although the Pap test is the most widely used cancer screening method in the world and its impact in the incidence of cervical cancer is well known from a historical perspective, recent reports suggest that the sensitivity of Pap smear is 50-60%, with the relative proportion of sampling to screening errors being 2:1. The tests may be further complicated by high unsatisfactory rates, preparation artifacts and unnecessary cost interventions. Each year in the United States alone approximately 3.6 million cell pathology tests are classified equivocal, out of which only 8% of women have precancerous (high-grade squamous intraepithelial) lesions, and 0.4% have cancer. The economic constraints in developing countries have prompted alternative methods of screening cancer including visual inspection after application of 3-5% of acetic acid and Lugol's iodine. The major disadvantage of these tests is low specificity. Given the considerable variation in the way these tests are applied and interpreted in different settings, there is no standard universally accepted definition of the test results. It remains to be seen if the specificity can be improved by further developments in test definitions and training strategies.

The increase in accuracy of the cell pathology tests will substantially decrease the need for invasive biopsy. While various technical solutions can improve the cell pathology tests and decrease the ambiguity of practitioner's interpretation (see, e.g., U.S. Patent Publication No. 2004/0137551), the problems in further improvement may have fundamental restrictions. Cytological tests are based on visual identification of abnormal cells, which could, for example, be the result of inflammation or irritation. HPV DNA testing detects just HPV infection, but not the cancerous or precancerous cells. In addition, there must be a sufficient amount of infected cells to be detected with DNA tests. Thus, there is a need for a new breakthrough to increase the accuracy of the above methods of detection of cervical cancer cells, preferably at the single cell level. A combination of cell pathology tests together with the use of biomarkers (physiomarkers) specific to cervical cancer cells (at the single cell level) is likely to be the right answer. The end product, the physiomarkers of cervical cancer can then be combined with the cell pathology tests to make the combined method sensitive, accurate, fast, and minimally invasive.

Atomic force microscopy ("AFM") method was invented in 1986 (Binnig et al. Atomic force microscope. *Phys. Rev. Lett.*, 56, 930-933, 1986). This technique is based on detection of forces acting between a sharp probe, the AFM tip, and sample surface. The tip is attached to a very flexible cantilever. Any motion of the cantilever is detected by various methods. The most popular is an optical system of detection. Laser light is reflected from the cantilever and detected by a photodiode. The tip is brought to a contact, engaged with the surface of interest. Scanning over the surface, the AFM system records the deflection of the cantilever with sub-nanometer precision. The AFM technique has been previously used to study cells (Pelling et al., Nanoscale visualization and characterization of *Myxococcus xanthus* cells with atomic force microscopy. *Proc Natl Acad Sci USA*, 102, 6484-9, 2005; Matzke et al., Direct, high-resolution measurement of furrow stiffening during division of adherent cells. *Nat Cell Biol*, 3, 607-10, 2001; Suresh, Biomechanics and biophysics of cancer cells. *Acta Biomater*, 3, 413-38, 2007; Sokolov, Atomic Force Microscopy in Cancer Cell Research. In: WEBSTER, H. S. N. A. T. (ed.) *Cancer Nanotechnology—Nanomaterials for Cancer Diagnosis and Therapy*. Los Angeles: APS, 2007; Lekka et al., The effect of chitosan on stiffness and glycolytic activity of human bladder cells. *Biochim Biophys Acta*, 1540, 127-36, 2001; Sokolov et al., Detection of surface brush on biological cells in vitro with atomic force microscopy. *Applied Physics Letters*, 91, 023902-1-3, 2007), including cancerous cervical cells (Iyer et al., Towards nonspecific detection of malignant cervical cells with fluorescent silica beads. *Small*, 5, 2277-2284, 2009, Iyer et al., AFM Detects Differences in the Surface Brush on Normal and Cancerous Cervical Cells. *Nat Nanotechnol*, 4, 389-393, 2009). The recently proposed new AFM mode, HarmoniX™ (Sahin et al., An atomic force microscope tip designed to measure time-varying nanomechanical forces. *Nat Nanotechnol*, 2, 507-14, 2007) as well as PeakForce™ (U.S. Patent Publication No. 2010/0122385) allows not only imaging cell surfaces but also obtaining maps of surface distribution of the rigidity modulus, dissipation energy, and adhesion, etc.

BRIEF SUMMARY OF THE INVENTION

It is therefore a principal object and advantage of the present invention to provide a method for the detection of cancer cells.

It is another object and advantage of the present invention to provide a method for the detection of cancer at the single cell level.

Other objects and advantages of the present invention will in part be obvious, and in part appear hereinafter.

There is a need for the following embodiments of the invention. Of course, the invention is not limited to these embodiments.

In accordance with the foregoing objects and advantages, the present invention provides a method for the detection of human cancer cells, the method comprising the steps of: (i) collecting cells from humans; (ii) preparing cells for scanning; (iii) scanning of the prepared cells by means of atomic force microscopy; and (iv) processing the obtained images through specific algorithms.

In accordance with the foregoing objects and advantages, the invention provides a method for the analysis of a cell collected from a patient, the method comprising the steps of: (i) preparing the cell for atomic force microscopy imaging; (ii) collecting an image of the prepared cell using an atomic force microscope; (iii) processing the collected image using a mathematical algorithm; and (iv) determining whether the prepared cell is a cancerous cell based on the results of the algorithm processing of the image. In a preferred embodiment, the cell is collected, for example, from a human patient with the methods used in a Pap smear or liquid cytology test. The cell may also be collected from the patient's blood or lungs, for example, or from a tissue biopsy.

According to a second embodiment of the invention is provided the previous method whereby the step of preparing the cell for atomic force microscopy imaging comprises the steps of fixing the cell followed by drying the cell. In a preferred embodiment the step of fixing is accomplished by chemical fixation using a fixative solution such as formaldehyde, paraformaldehyde, glutaraldehyde, Karnovsky's fixative solution, or a combination thereof. Drying of the cell can be accomplished by, for example, vacuum drying, freeze drying, or subcritical concentration-drying.

According to a third embodiment of the invention is provided the above method whereby the atomic force microscopy image is a topology image, a rigidity image, a stiffness image, an adhesion image, a peak force image, dissipation energy information, or any combination thereof. Additionally, the atomic force microscope can be working in any mode known to those of skill in the art, including HarmoniX mode, PeakForce mode, or PulseForce mode.

According to a fourth embodiment of the invention is provided the above method whereby the mathematical algorithm uses (a) a predefined part of the collected image for processing, and (b) a set of surface parameters of the imaged cell based on the predefined part of the collected image. The set of surface parameters can comprise an amplitude parameter, a hybrid parameter, a functional parameter, a spatial parameter, or any mathematical function of the combination thereof, for example. The parameters can include, but are not limited to, the following non-exclusive list of parameters: Sa (Roughness Average), Sq (Root Mean Square), Ssk (Surface Skewness), Sku (Surface Kurtosis), Sz (Peak-Peak), St (Peak-Peak), S10z (Ten Point Height), Sv (Max Valley Depth), Sp (Max Peak Height), Smean (Mean Value), Ssc (Mean Summit Curvature), Sti (Texture Index), Sdq (Root Mean Square Gradient), Sdq6 (Area Root Mean Square Slope), Sdr (Surface Area Ratio), S2A (Projected Area), S3A (Surface Area), Sbi (Surface Bearing Index), Sci (Core Fluid Retention Index), Svi (Valley Fluid Retention Index), Spk (Reduced Summit Height), Sk (Core Roughness Depth), Svk (Reduced Valley Depth), Sdcl-h (l-h % height intervals of Bearing Curve), Sds (Density of Summits), Std (Texture Direction), Stdi (Texture Direction Index), Srw (Dominant Radial Wave Length), Srwi (Radial Wave Index), dShw (Mean Half Wavelength), Sfd (Fractal Dimensionality), Scl20 (Correlation Length at 20%), Scl37 (Correlation Length at 37%), Str20 (Texture Aspect Ratio at 20%), Str37 (Texture Aspect Ratio at 37%), and any combination thereof.

According to a fifth embodiment of the invention is provided the above method whereby the image of the prepared cell is collected using a set of predefined scanning parameters. In a preferred embodiment, this set of predefined scanning parameters is determined based on a predefined required accuracy of the surface parameters of the said set. The predefined required accuracy is determined by the algorithm.

According to a sixth embodiment of the invention is provided the above method whereby the step of determining whether the prepared cell is a cancerous cell comprises the steps of: (i) calculating the surface parameters of the said set for the imaged cell; (ii) determining that the prepared cell is a cancerous cell if the said calculated surface parameters belong to a first predefined volume in the space of surface parameters of said set, or determining that the prepared cell is a healthy cell if the said calculated surface parameters belong to a second predefined volume in the space of the surface parameters of the said set.

According to a seventh embodiment of the invention is provided the above method whereby the mathematical algorithm is based on the use of the fractal dimensionality of an adhesion map of the prepared cell. As a non-limiting example, the fractal dimensionality can be calculated by using a Fourier transformation of an adhesion image of the prepared cell. In a preferred embodiment, the fractal dimensionality is calculated for a reciprocal range of 3-25 $\mu m^{-1}$.

These and other embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE SEVERAL VIEWS OF THE DRAWING(S)

The drawings accompanying and forming part of this specification are included to depict certain embodiments of the invention. A clearer conception of embodiments of the invention, and of the components combinable with, and operation of systems provided with, embodiments of the invention, will become more readily apparent by referring to the exemplary, and therefore non-limiting, embodiments illustrated in the drawings, wherein identical reference numerals (if they occur in more than one view) designate the same elements. Embodiments of the invention may be better understood by reference to one or more of these drawings in combination with the description presented herein.

Figure 6:
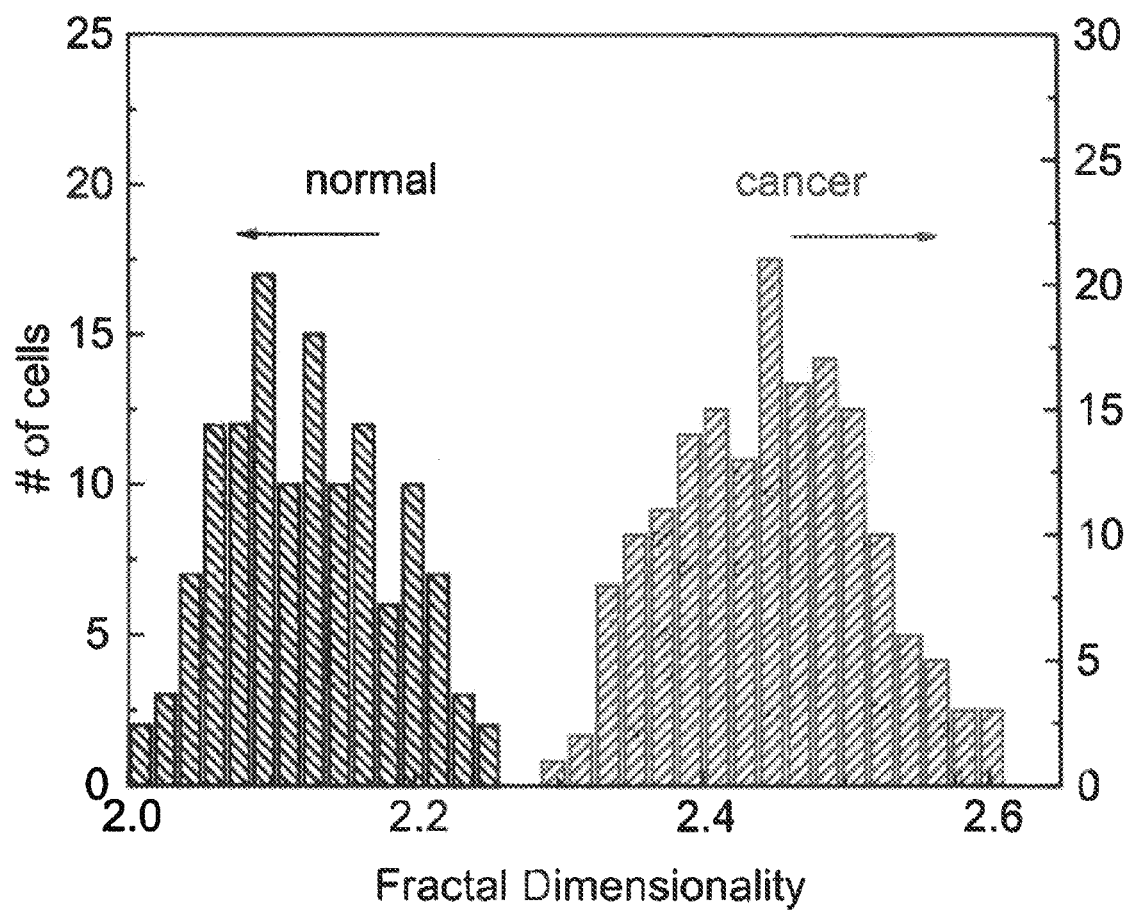
Figure 7:
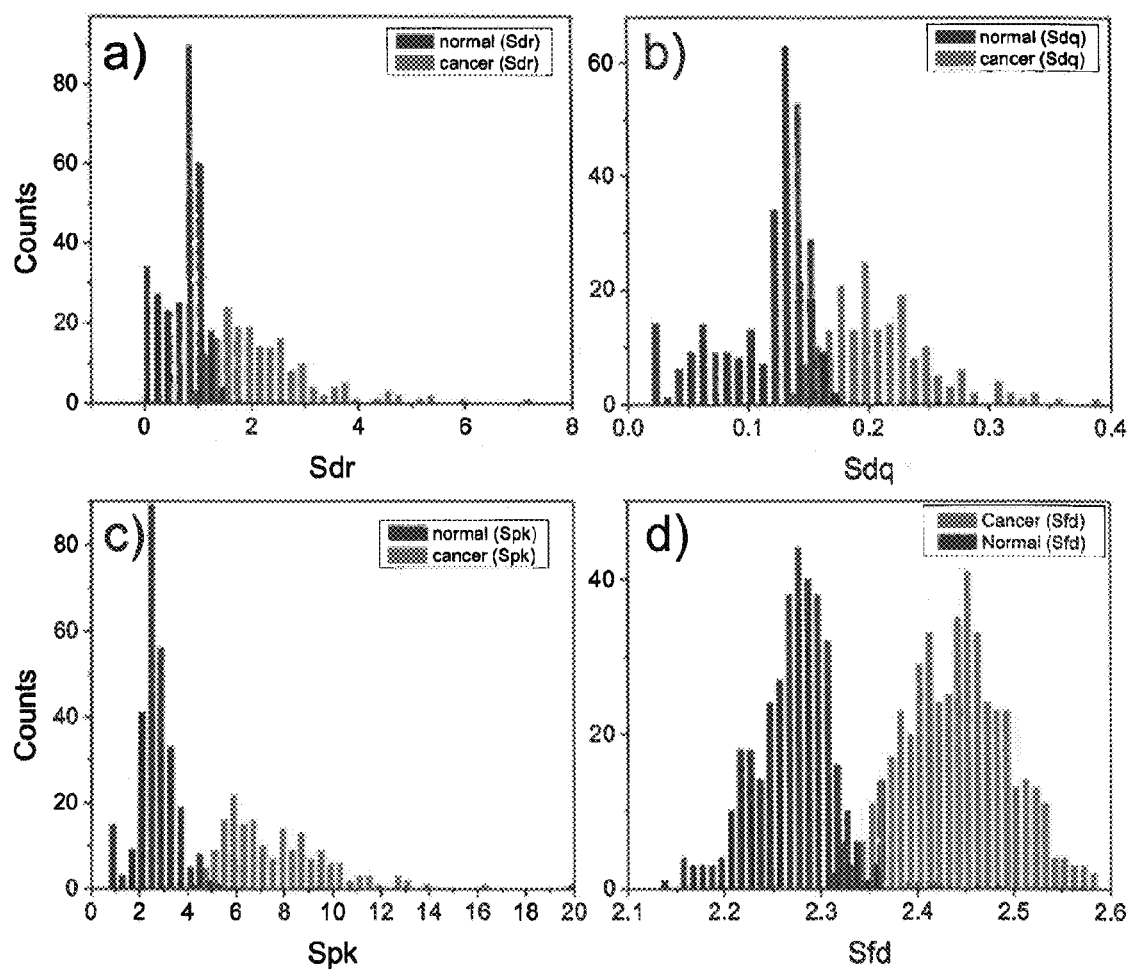
Figure 8:
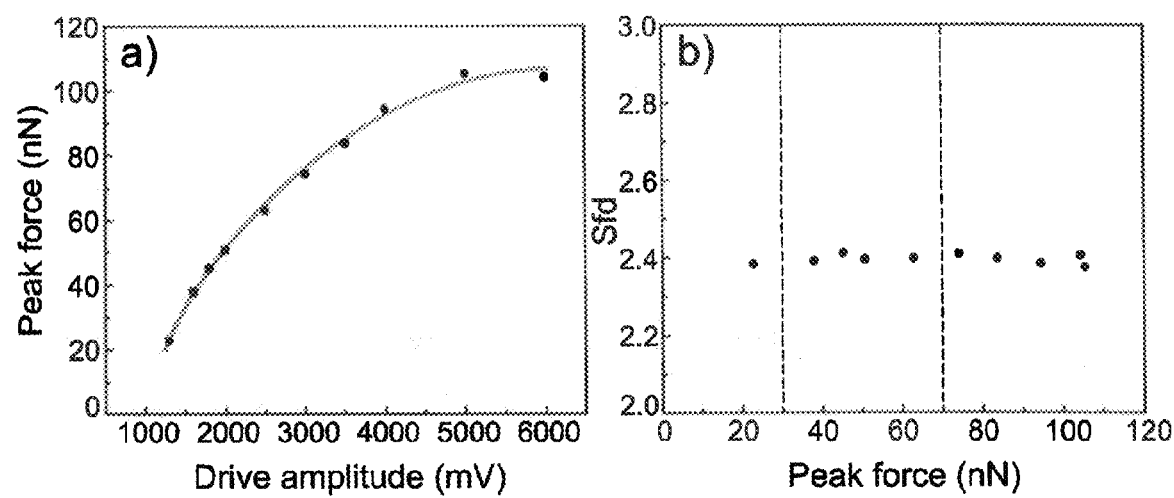
Figure 9:
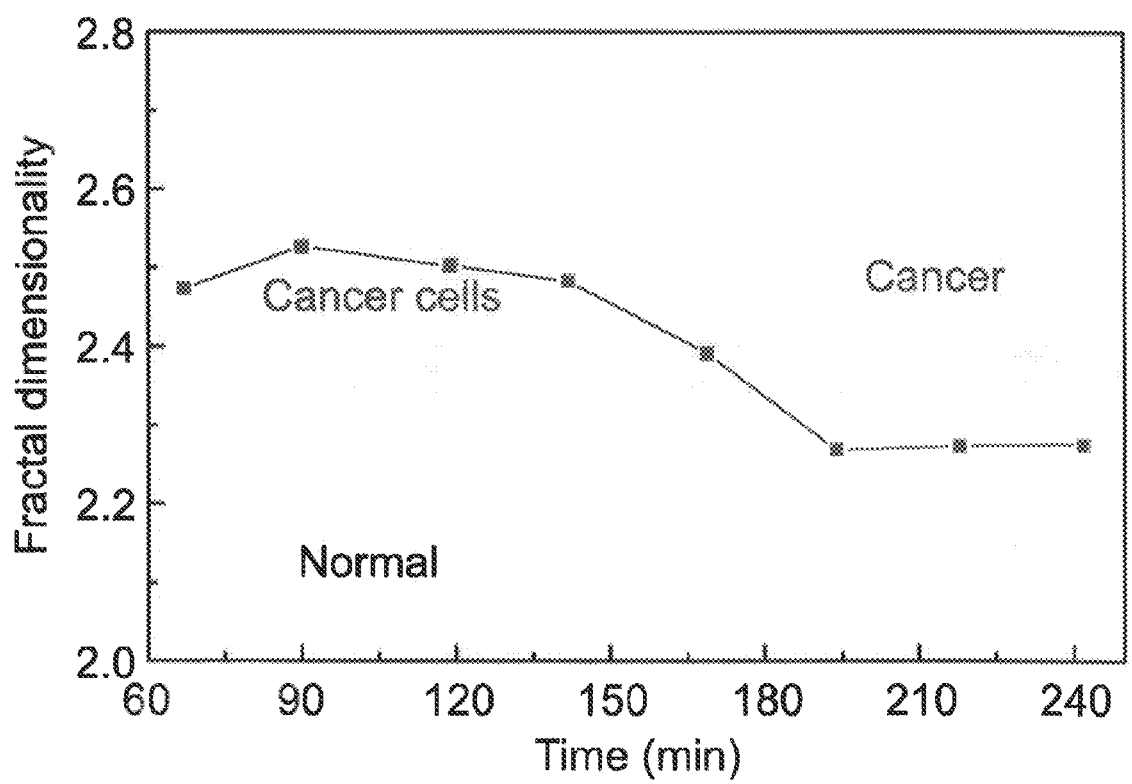

FIG. 6 is a view of fractal dimensionality parameter calculated for cancer and normal cells. Distribution of number of cells vs. fractal dimensionality ("FD") for cancer and normal cells is shown. Each value shown corresponds to a single cell. It was found as an average of the fractal dimensionalities calculated on 5×5 square microns maps collected at 4 areas on each cell;

FIG. 7 is a view of the distributions of various parameters: Distribution of Surface Area Ratio ("Sdr"), Root Mean Square Gradient ("Sdq"), Reduced Summit Height ("Spk") and Fractal Dimension ("Sfd") parameters for cancer (shown with red bars) and normal (shown with blue bars) cells;

FIG. 8 is a view of the dependence of fractal dimensionality of the adhesion map of the cell surface in the function of the load peak force; (a) The peak scanning force as a function of the voltage applied on the AFM probe holder; and (b) Dependence of the fractal dimensionality ("Sfd") of the adhesion map on the load peak force; and FIG. 9 is a view of the dependence of the fractal dimensionality of the adhesion map on the time since sample was moved into ambient condition of higher humidity. Red and blue zones show the range of values of fractal dimensionality for cancer and normal cells. Fractal dimensionality was calculated for the reciprocal length ranging from 3 to 25 l/um.

DETAILED DESCRIPTION OF THE INVENTION

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. It should be noted that several publications are referenced within this application. The disclosures of these publications in their entireties are hereby expressly incorporated by reference herein.

This invention represents a novel approach for the diagnostics of cancer cells based on the mathematical analysis of images of cell surfaces obtained by means of atomic force microscopy ("AFM"). It is advantageous when AFM works in one of the advanced modes, which allow collecting both surface topography and physicochemical properties over the cell surface. The advanced modes can be exemplified by, for example, HarmoniX™, PulseForce™, or PeakForce™ modes of operation.

The aforementioned AFM modes allow not only imaging cell surfaces but also obtaining maps of surface distribution of the rigidity modulus, dissipation energy, and adhesion, etc. Processing this additional information can provide the ground for either a separate method for identification of cancer cells, or be supportive and used to improve the accuracy of the identification (see, the EXAMPLES below for more detail).

The method includes a step of collecting cells from humans. While being possible to collect cells from almost any type of cancer, it is practical to apply the invention to identify cancers that do not require tissue biopsy to extract the cells. Non-limiting examples of such cancers include blood cancer, lung cancer, cervical cancer, etc. The cells can be collected in any way used in cell biology and medical practice, for example, by means of the Papanicolaou ("Pap") smear test or liquid cytology tests, through collecting blood samples, etc. The present invention does not require the development of a novel method to collect cells for analysis. Any modification of the collection procedure does not restrict the embodiments of the invention.

The method includes a step of preparing cells for the AFM scanning. To increase the accuracy of the AFM imaging, and to simplify handling of the cells, the cells are fixed. Preparation of cells for the AFM imaging comprises of fixing and drying the cells to subsequently scan the cells in ambient conditions. Any fixation protocol can be used that is known to the skilled in art. After fixing, cells can be dried in air of predefined humidity, in vacuum, in dry gases, in subcritical drier, in a freeze drier, etc. Any modification of the preparing cell procedure does not restrict the embodiments of the invention.

The method includes a step of collecting AFM images of the cell surface. This can be done with any AFM that is capable recording predefined AFM images. The said predefined images are identified by the predefined algorithms as described below. Any mode of AFM operation, which can provide said predefined AFM images, can be used. For example, to obtain the image of adhesion, one can use HarminiX™ or PeakForce™ or Pulse Force™ modes of AFM operation, or any other method known to those of skill in the art.

The method includes the step of mathematical processing of the recorded predefined AFM images. This step comprises two sub-steps:

Sub-step 1 is the analysis of various surface parameters of the image, which are defined through mathematical formulas and/or algorithms by using pixel values of the recorded predefined AFM images. A non-restrictive example might include, for example, a family of parameters described below (most of them are described in US standards ISO 4287/1 ASME B46.1; ISO/DIS 25178-2): Amplitude parameters: Sa (Roughness Average), Sq (Root Mean Square (RMS)), Ssk (Surface Skewness), Sku (Surface Kurtosis), Sz (Peak-Peak), St (Peak-Peak), S10z (Ten Point Height), Sv (Max Valley Depth), Sp (Max Peak Height), Smean (Mean Value); Hybrid Parameters: Ssc (Mean Summit Curvature), Sti (Texture Index), Sdq (Root Mean Square Gradient), Sdq6 (Area Root Mean Square Slope), Sdr (Surface Area Ratio), S2A (Projected Area), S3A (Surface Area); Functional Parameters: Sbi (Surface Bearing Index), Sci (Core Fluid Retention Index), Svi (Valley Fluid Retention Index), Spk (Reduced Summit Height), Sk (Core Roughness Depth), Svk (Reduced Valley Depth), Sdcl-h (l-h % height intervals of Bearing Curve); Spatial Parameters: Sds (Density of Summits), Std (Texture Direction), Stdi (Texture Direction Index), Srw (Dominant Radial Wave Length), Srwi (Radial Wave Index), dShw (Mean Half Wavelength), Sfd (Fractal Dimensionality), Scl20 (Correlation Length at 20%), Scl37 (Correlation Length at 37%), Str20 (Texture Aspect Ratio at 20%), Str37 (Texture Aspect Ratio at 37%).

Sub-step 2 is the utilization of a mathematical algorithm to identify the type of cells (either cancer or normal) based on the use of either one parameter or a predefined set of parameters chosen from the those described in Sub-step 1. The algorithm is a set of rules defining ranges of values for each used parameter. Mathematically speaking, the algorithm defines the equation: Φ(surface parameters list)=0, where Φ is a mathematical function defining the surface boundary of the volume in the space of the predefined set of parameters.

The AFM images have a defined digital resolution and the physical size of the image. The corresponding embodiments of the present invention are deal with AFM images of predefined digital resolution and predefined physical size of the image. The said predefined digital resolution and predefined physical size of the image should be greater than a minimum resolution and physical image size, which is sufficient to derive the parameters described in Sub-step 1 with the predefined accuracies. The said predefined accuracies of the parameters are defined by the accuracy of identification of cancer cells of the present disclosed method and/or specificity and/or sensitivity of the cancer cell diagnostics. As a non-restrictive example, if the accuracy of identification of cancer cells is 95%, this may allow the derivation of the value of the used parameters with the accuracy of 80%. To obtain such accuracy of the used parameters, one may find the minimum digital resolution in the minimum physical size of the image should be 512×512 pixels and 1×1 square microns.

The AFM images depend on the radius of curvature of the AFM probe. The corresponding embodiments of the present invention are deal with AFM images obtained using a predefined range of radii of curvature of the AFM probes. The said predefined range of radii of curvature of the AFM probes is defined by the requirement to derive the parameters described in Sub-step 1 with the predefined accuracies. The said predefined accuracies of the parameters are defined by the accuracy of identification of cancer cells of the present disclosed method and/or specificity and/or sensitivity of the cancer cell diagnostics. As a non-restrictive example, if the accuracy of identification of cancer cells is 95%, this may allow the derivation of the value of the used parameters with the accuracy of 80%. To obtain such accuracy of the used parameters, one may find the range of radii of curvature of the AFM probes to be from 10 to 50 nanometers.

The AFM images, which are obtained when scanning in ambient conditions, depend on the humidity of the environment around the cells when scanning and the time the cell sample stayed in that humidity. The corresponding embodiments of the present invention are deal with AFM images obtained using a predefined humidity of the environment around the cells when scanning and a predefined time the cell sample stayed in that humidity. The maximum of said predefined humidity of the environment around the cells when scanning and the maximum predefined time the cell sample stayed in said predefined humidity are defined by the requirement to derive the parameters described in Sub-step 1 with the predefined accuracies. The value of the maximum of said predefined humidity of the environment around the cells when scanning and the value of the maximum predefined time the cell sample stayed in said predefined humidity may be mutually dependent, and therefore, may be defined dependent on each other. The said predefined accuracies of the parameters are defined by the accuracy of identification of cancer cells of the present disclosed method and/or specificity and/or sensitivity of the cancer cell diagnostics. As a non-restrictive example, if the accuracy of identification of cancer cells is 95%, this may allow the derivation of the value of the used parameters with the accuracy of 80%. To obtain such accuracy of the used parameters, one may find the said maximum humidity should the less than 70% when the said maximum scanning time in such humidity should be smaller than two hours.

The AFM images depend on various scanning parameters such as load force (frequently defined as the setpoint), feedback gain parameters, speed of scanning, and others known to one skilled in art. The corresponding embodiments of the present invention are deal with AFM images obtained using a predefined range of the scanning parameters. The said predefined range of the scanning parameters is defined by the requirement to derive the parameters described in Sub-step 1 with the predefined accuracies. The said predefined accuracies of the parameters are defined by the accuracy of identification of cancer cells of the present disclosed method and/or specificity and/or sensitivity of the cancer cell diagnostics. The value of the said scanning parameters may be mutually dependent, and therefore, may be defined dependent on each other. As a non-restrictive example, if the accuracy of identification of cancer cells is 95%, this may allow the derivation of the value of the used parameters with the accuracy of 80%. To obtain such accuracy of the used parameters, one may find the range for the load force to 10-50 nanoNewtons, while the speed of screening range should be within 0.5-2 Hertz, proportional feedback gain parameter within 0.1-1, integral feedback gain parameter within 0.1-1, and so on.

It is not exclusive that the AFM images can mutually dependent on the said scanning parameters and/or the said radius of curvature of the AFM probe and/or the said humidity of the imaging environment and/or the said maximum scanning time in such humidity and/or the said physical size of the AFM image and/or the said digital resolution of the AFM image. The corresponding embodiments of the present invention are deal with AFM images obtained using the predefined ranges of the parameters described in Sub-step 1 with the predefined accuracies. The said predefined accuracies of the parameters are defined by the accuracy of identification of cancer cells of the present disclosed method and/or specificity and/or sensitivity of the cancer cell diagnostics. As a non-restrictive example, if the accuracy of identification of cancer cells is 95%, this may allow the derivation of the value of the used parameters with the accuracy of 80%. To obtain such accuracy of the used parameters, one may use a predefined protocol which comprises the ranges of all parameters important for scanning, which can be identified by one skilled in art. Nonrestrictive examples of such parameters were listed above, which in particular comprised of the said scanning parameters, the said radius of curvature of the AFM probe, the said humidity of the imaging environment, the said maximum scanning time in such humidity, the said physical size of the AFM image, and the said digital resolution of the AFM image, among many others.

Mathematical, in particular, fractal analysis, has previously been applied to analyze malignancy of histological images of epithelial tissue biopsies (see, e.g., Losa, *Fractals in biology and medicine. Volume*, Basel; Boston, Birkhauser, 2005; Losa, Fractals in pathology: are they really useful? *Pathologica*, 87, 310-7, 1995; Mashiah et al., Lymphoma and leukemia cells possess fractal dimensions that correlate with their biological features. *Acta Haematol*, 119, 142-50, 2008). Specifically, 1D (one-dimensional) perimeter of cross-sections of cells or cell nuclei was analyzed in those works. However, the fractal property of the actual 2D (two-dimensional) surface of biological cells, which can be obtained using the AFM method, has not been previously studied. Furthermore, the advanced modes of AFM operation, for example the HarmoniX mode, allows recording not only such a 2D topographical surface, but also the distribution of the adhesive force between the AFM probe and cell surface (hereafter, the adhesion map).

To exemplify the level of mathematical algorithms which can be used within the primary embodiment of the invention, the following nonlimiting example is described. For example, if a set of the cell parameters defined in Sub-step 1 belongs to a predefined volume in the space of the said parameters, the cell is cancerous (with certain accuracy). The said predefined volume can be defined as the minimum volume in the parameter space which covers 100% of cancerous cells. The accuracy of such an algorithm will be defined on a set of healthy and cancer cells, and be equal to the percentage of cancer cells among all (cancer+healthy) cells that belong to this volume. It is the simplest possible definition of identifiers of single cancer cell. Other definitions can easily be identified by one skilled in art. It is also possible to introduce specificity (the term used in cell pathology tests) of the algorithm. For example, if a set of the cell parameters defined in Sub-step 1 belongs to a predefined volume in the space of the said parameters, the cell is normal (with certain accuracy). The said predefined volume can be defined as the minimum volume in the parameter space which covers 100% of normal cells. The accuracy of such an algorithm will be defined on a set of healthy and cancer cells, and be equal to the percentage of normal cells among all (cancer+healthy) cells that belong to this volume. The accuracy of such an algorithm is specificity of the cancer identification method.

EXAMPLES

Specific embodiments of the invention will now be further described by the following, nonlimiting examples which will serve to illustrate in some detail various features. The following examples are included to facilitate an understanding of ways in which an embodiment of the invention may be practiced. It should be appreciated that the examples which follow represent embodiments discovered to function well in the practice of the invention, and thus can be considered to constitute preferred mode(s) for the practice of the embodiments of the invention. However, it should be appreciated that many changes can be made in the exemplary embodiments which are disclosed while still obtaining like or similar result without departing from the spirit and scope of an embodiment of the invention. Accordingly, the examples should not be construed as limiting the scope of the invention.

Example 1

Preparation of Cells

Cells were fixed with Karnovsky's fixative as follows. The cells were washed twice with 1× phosphate buffered solution (PBS). The cells were then treated with 4 ml of Karnovsky's fixative overnight at 4° C. After the overnight treatment the cells were washed twice with 4 ml of 0.2M sodium phosphate buffer at an interval of 2 hours to remove excess Karnovsky's fixative and kept overnight at 4° C. Finally, the cells were washed with 5 ml of DI water twice before freeze drying. The cell samples thus prepared can be preserved for several weeks with DI water at 4° C. before freeze drying them. After fixing, water was removed by freeze-drying (using Labconco Lyph-Lock 12 freeze dryer). Cells were imaged directly in culture dishes after not more than 30 minutes after removing from dessicator. The dried samples can be preserved at least for several weeks in a desiccator.

Example 2

Use of Atomic Force Microscopy

Figure 1:
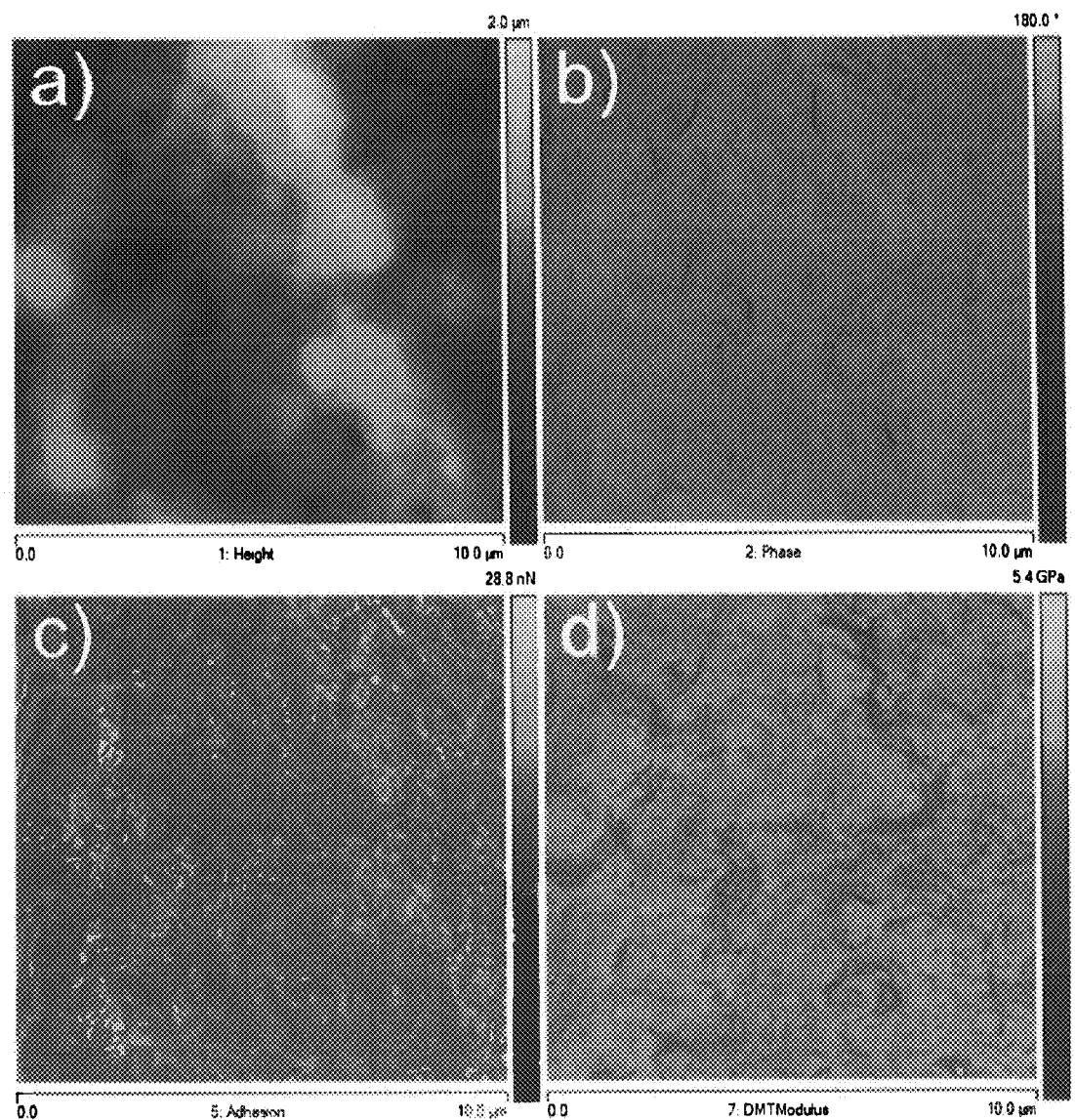
FIG. 1 is a view of AFM topology (height) (a), phase (b), adhesion (c) and rigidity (d) images of a fixed cancer cell.
Figure 2:
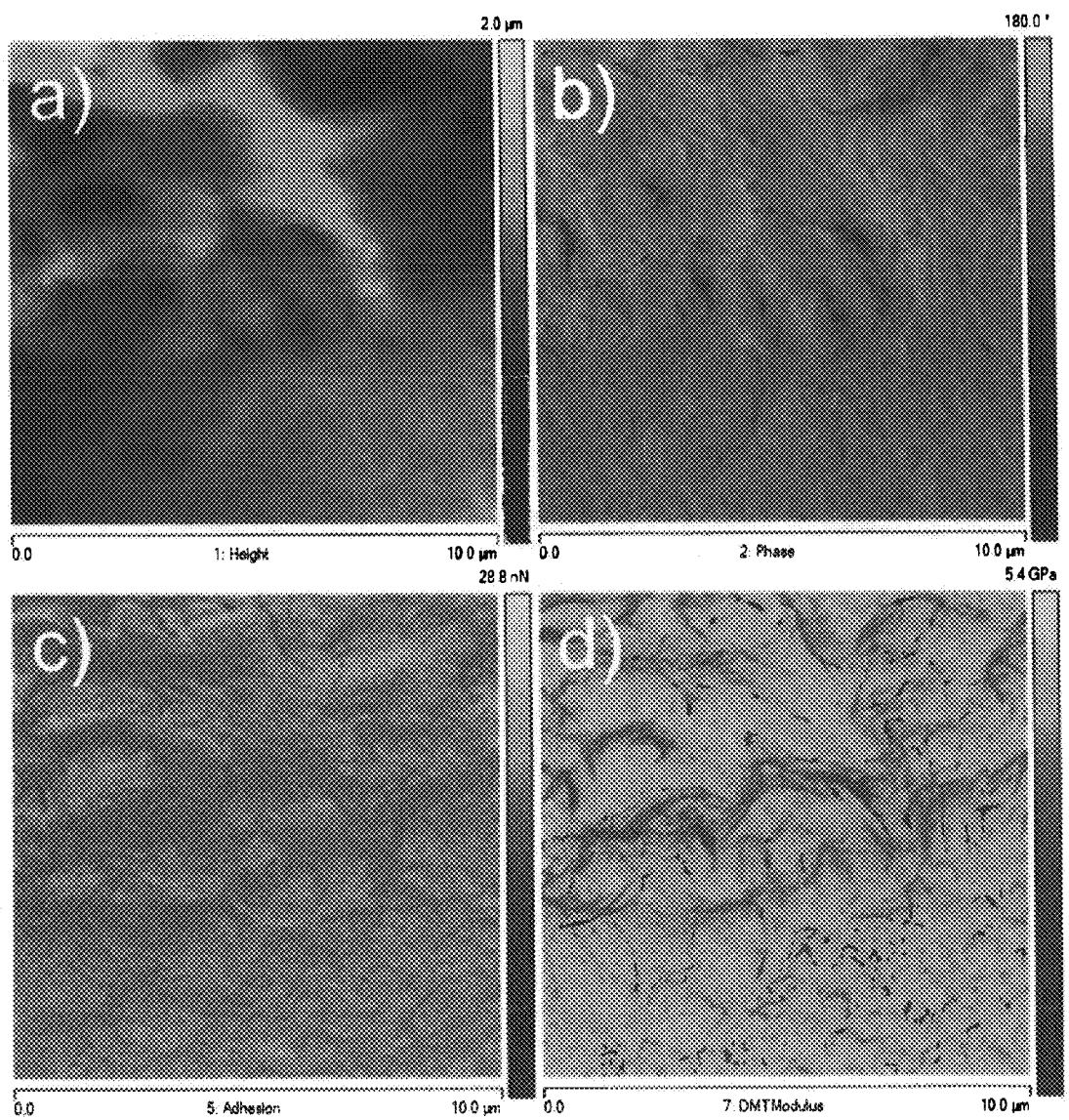
FIG. 2 is a view of AFM topology (height) (a), phase (b), adhesion (c) and rigidity (d) images of a fixed normal cell.

Atomic force microscope DM3100 by Veeco, Inc was used operating in HarmoniX™ to collect series of images comprising of topology, rigidity, adhesion, peak force, and dissipation information of the cell surface. The images were collected for each cell. Standard HarmoniX cantilevers (HMX) To collect information from cells with large size variability scan area of 10×10 µm$^2$ with resolution of 512×512 pixels was chosen. An example of topology, phase, adhesion and rigidity maps of fixed cancer and normal cells are shown in FIGS. 1 and 2, respectively. The calculation of the surface parameters can be done for each image. The obtained surface parameters will be used in the algorithms to distinguish normal and cancer cells. It should be noted that only a predefined part of each AFM image may be used to derive the surface parameters. The definition of the predefined part of the image to be analyzed is a part of the cancer-identifying algorithm. As a non-limiting example, the said predefined part of each AFM image may be a part of the cell surface which is free from filopodia fibers.

Example 3

Algorithms

Human epithelial cervical cells were used in these examples. In the examples listed below, the cells were collected from biopsies of tumors of 4-6 cancer patients and from healthy tissues of 4-6 individuals. Primary cultures of human cervical epithelial cells were prepared from tissues collected from the transformation zone of cervix. The cell isolation was performed by a two-stage enzymatic digestion using dispase to remove the epithelium and then trypsin to disperse the individual epithelial cells (Woodworth et al., Characterization of normal human exocervical epithelial cells immortalized in vitro by papillomavirus types 16 and 18 DNA. Cancer Res, 48, 4620-8, 1988). Normal and cancerous cell cultures were maintained in keratinocyte serum free medium (KSFM, Invitrogen, Carlsbad, Calif.) under the same experimental conditions. KSF-M is a well-defined and widely used medium for growth of epithelial cells. Fibroblasts and other cell types do not grow in this medium. All human tissue was obtained from the Cooperative Human Tissue Network. Informed consent was obtained from patients according to their published guidelines. Normal (healthy) cervical cells were used at 20 to 40 population doublings, when they were actively growing, and carcinoma cell lines were used at passages 40 to 120. The higher number of divisions of cancer cells was used to avoid possible confusion between cancer and normal cells (possibly normal cells present in the cancer culture dish would die out before that number of population doublings). The higher number of divisions of cancer cells is expected not to change cancer cells. All cells were plated in 60 mm tissue culture dishes and dishes were used for experiments when cells reach <50% confluency. Epithelial cells adhered tightly to the bottom of the tissue culture dishes.

Algorithm Example 1

Figure 3:
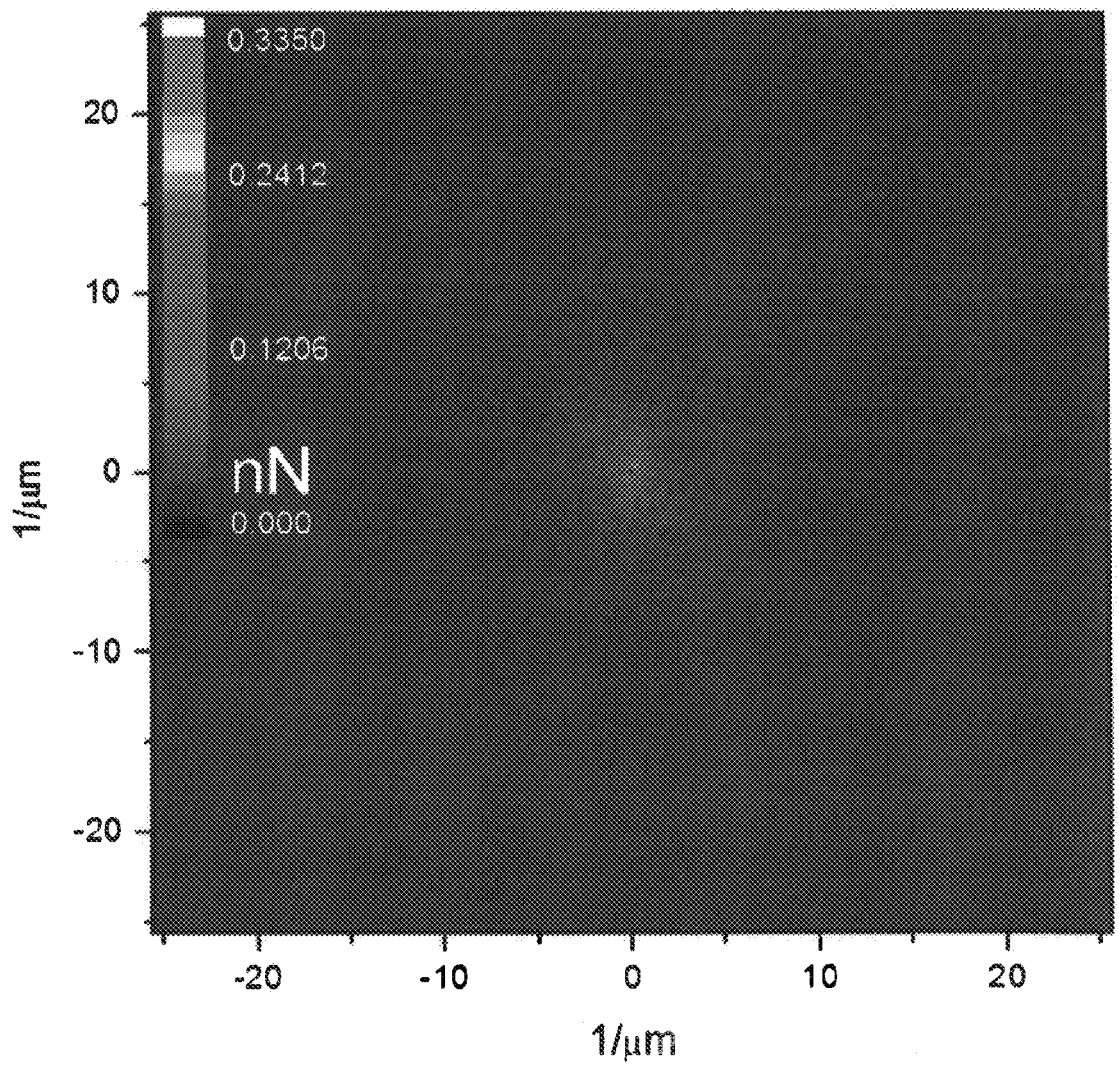
FIG. 3 is a view of two-dimensional Fourier map of an adhesion image of cancer cell.

The maximum difference in the parameters between cancerous and normal cells was found for the parameter characterizing fractal dimensionality of the adhesion force images (FIGS. 1(*c*) and 2(*c*)). The fractal dimensionality could be calculated by using different methods. Specifically it was found here as follows. To analyze fractal behavior at a different correlation length-scale, two-dimensional Fourier transformation of the adhesion images was calculated in the magnitude scale, FIG. 3. The followed equation was utilized:

$$F(u, v) = \frac{1}{N_x N_y} \sum_{x=0}^{N_x-1} \sum_{y=0}^{N_y-1} z(x, y) e^{-i2\pi(ux/N_x + vy/N_y)} \quad \text{(equation 1)}$$

Where $N_x$, $N_y$ are the number of pixels in the x, y directions and u, v the discrete Fourier indexes=0, 1, 2, ... $N_{x-1}$ and v=0, 1, 2 ... $N_{y-1}$.

Figure 4A:
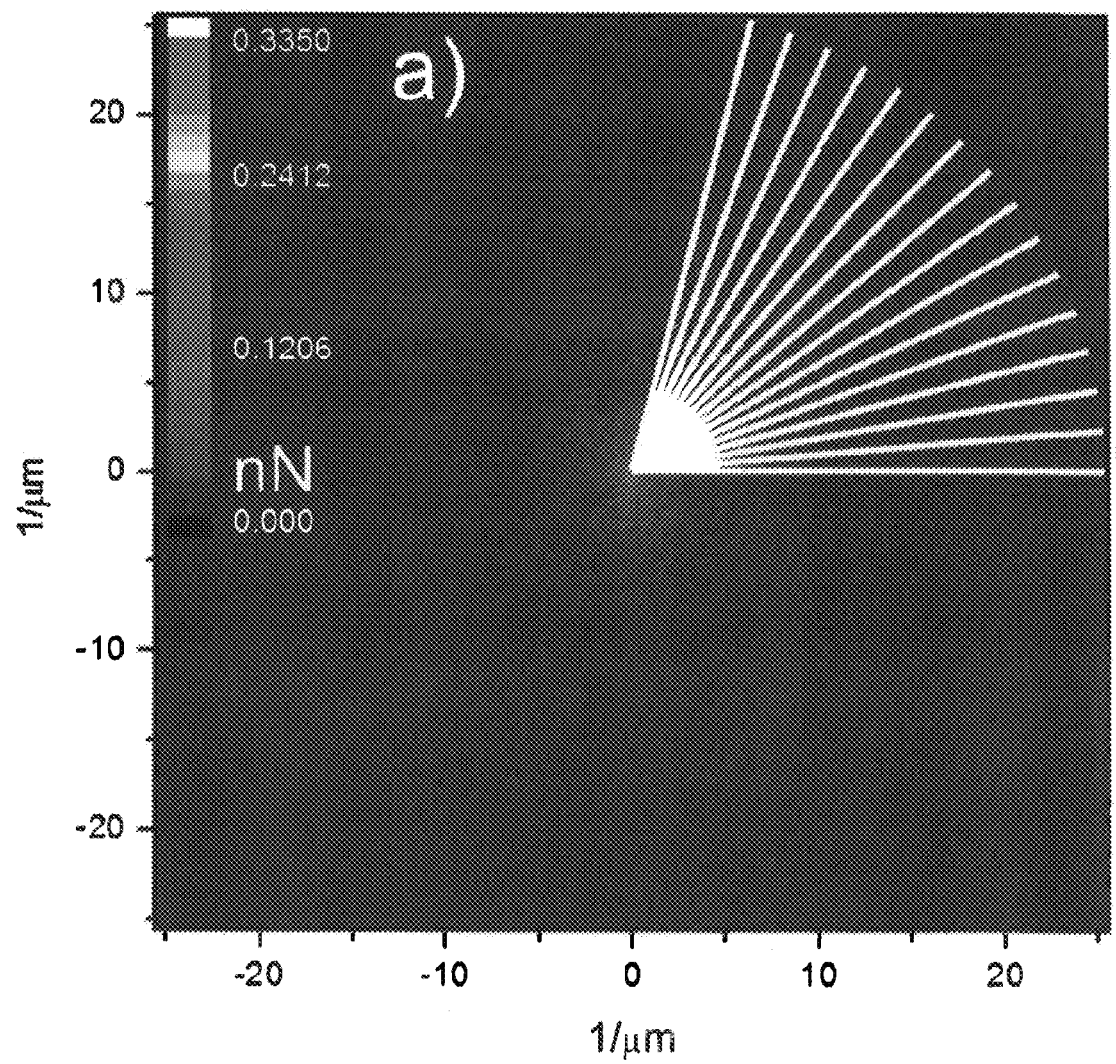
FIG. 4 is a view of a typical Fourier magnitude spectrum map (a) and unidirectional cross section (b)
Figure 4B:
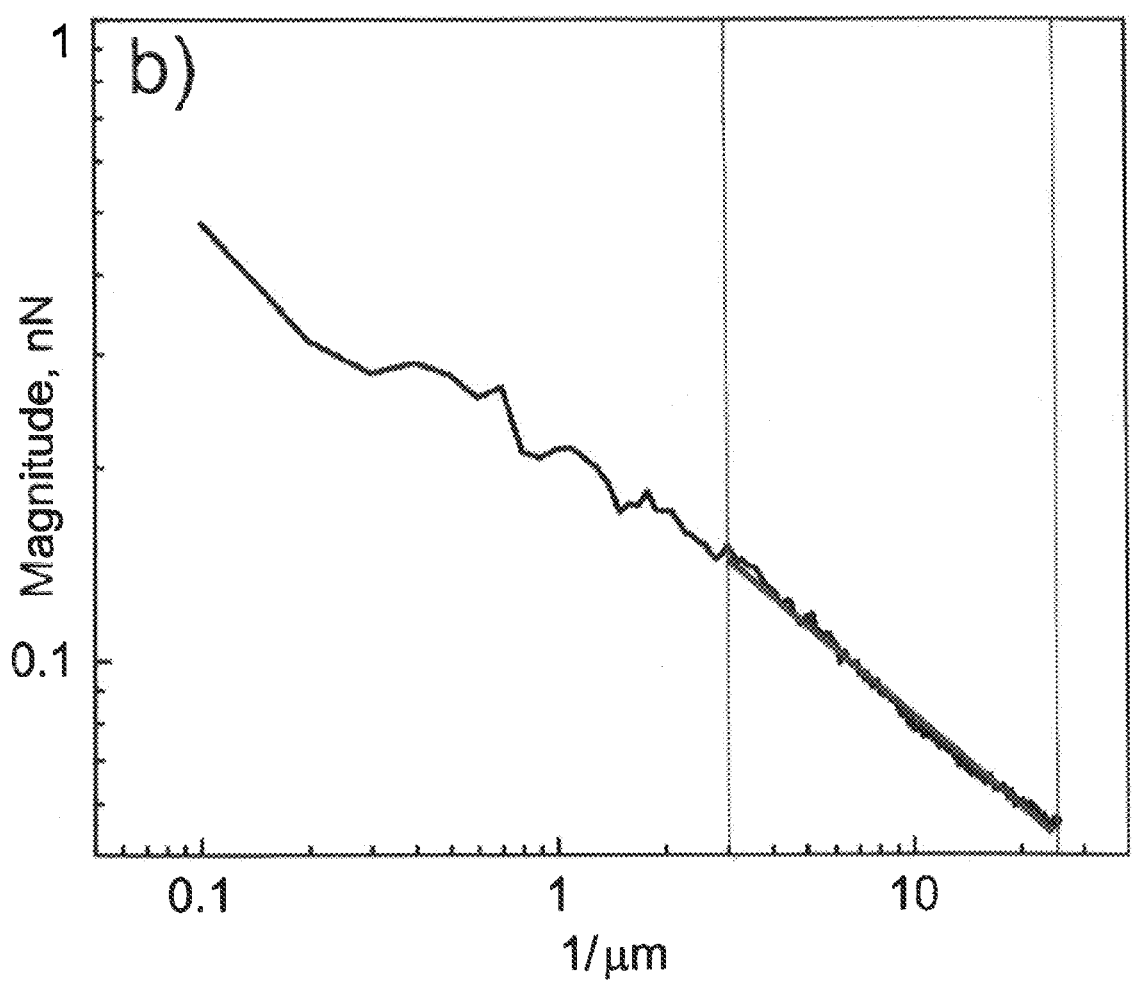

Then the radial spectrum was average on all angles from 0 to 180 for top half-plane, as shown in FIG. 4. The linear fitting in log-log scale of the averaged radial spectrum was done using allometric law $z=at^b(\log(z)=\log(a)+b\log(t))$ in a reciprocal range of 3-25 µm$^{-1}$, FIG. 4b, which corresponds to 40-330 nm size of the features in real space. Here the slope b of the fitting curve is corresponding to a fractal dimensionality, which can be calculated as $\alpha=2-b$.

Figure 5:
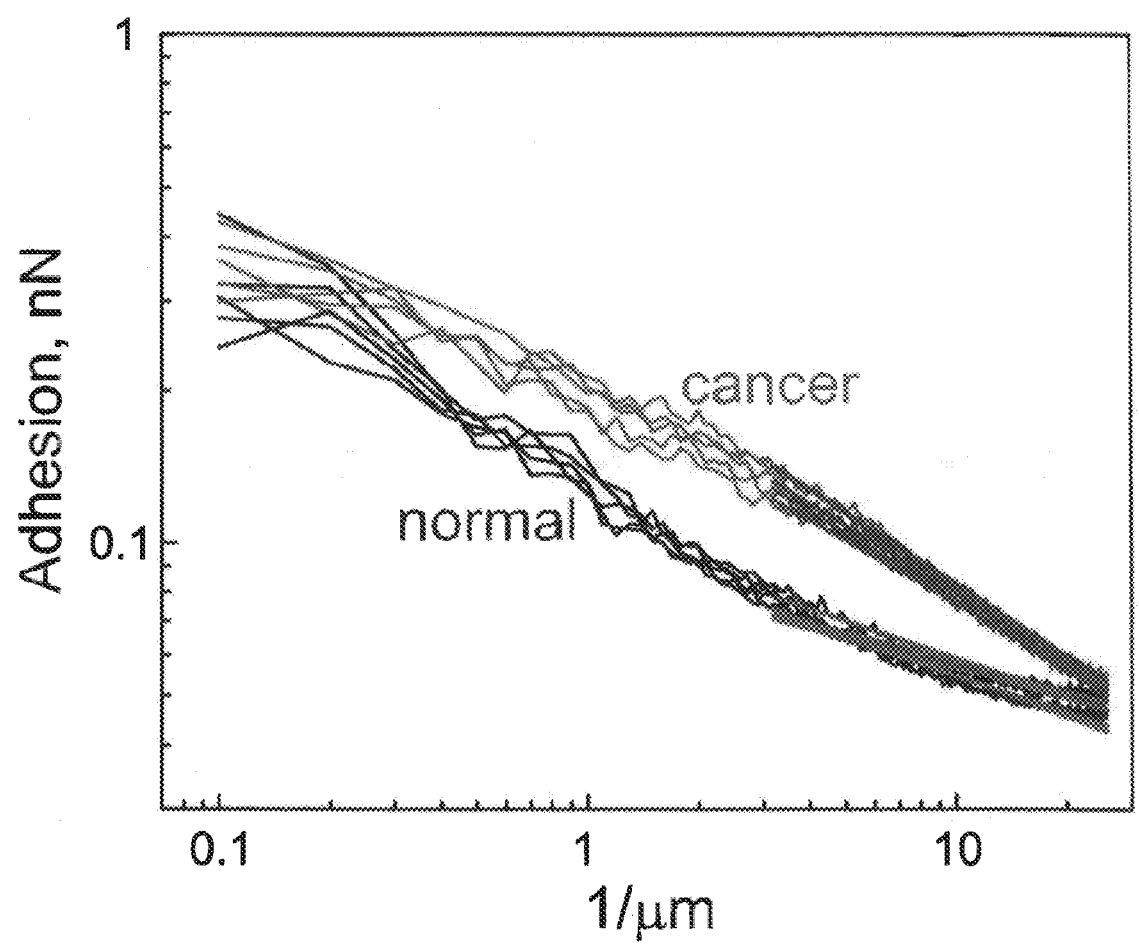
FIG. 5 are a view of averaged cross-sections of adhesion Fourier map for cancer (red) and normal (blue) cells. Allometrical fitting is shown for 3-25 $\mu m^{-1}$ range.

The average cross-section was calculated for all adhesions force images from cancer and normal cells. FIG. 5 shows an example of averaged cross-sections for cancer and normal cells. Each curve corresponded to a single cell. The average cross-section for all cells was fitted by allometrical low within the range of 3-25 µm$^{-1}$ and effective, for chosen reciprocal range, fractal dimensionality was calculated. FIG. 6 demonstrates the distribution of this fractal dimensionality for all measured cancer and normal cells. The algorithmic rule is in this case as follows. If the fractal dimensionality is higher than 2.36, the cell is cancerous. If the fractal dimensionality is less than 2.25, then the cell is healthy. This is the minimum volume that covers 100% of cancer cells in one-dimensional space of the surface parameters. The accuracy of this definition as defined on said subjects is absolute, 100% with zero false-positive.

It should be noted that the AFM technique has been previously used to study cells (Pelling et al., Nanoscale visualization and characterization of *Myxococcus xanthus* cells with atomic force microscopy. *Proc Natl Acad Sci USA*, 102, 6484-9, 2005; Matzke et al., Direct, high-resolution measurement of furrow stiffening during division of adherent cells. *Nat Cell Biol*, 3, 607-10, 2001; Suresh, Biomechanics and biophysics of cancer cells. *Acta Biomater*, 3, 413-38, 2007; Sokolov, Atomic Force Microscopy in Cancer Cell Research. In: WEBSTER, H. S. N. A. T. (ed.) *Cancer Nanotechnology—Nanomaterials for Cancer Diagnosis and Therapy*. Los Angeles: APS, 2007; Lekka et al., The effect of chitosan on stiffness and glycolytic activity of human bladder cells. *Biochim Biophys Acta*, 1540, 127-36, 2001; Sokolov et al., Detection of surface brush on biological cells in vitro with atomic force microscopy. *Applied Physics Letters*, 91, 023902-1-3, 2007), including cancerous cervical cells (Iyer et al., Towards nonspecific detection of malignant cervical cells with fluorescent silica beads. *Small*, 5, 2277-2284, 2009, Iyer et al., AFM Detects Differences in the Surface Brush on Normal and Cancerous Cervical Cells. *Nat Nanotechnol*, 4, 389-393, 2009). The recently proposed new AFM mode, HarmoniX, allows not only imaging cell surfaces but also obtaining maps of surface distribution of the rigidity modulus, dissipation energy, and adhesion. Cancer-specific features of the surface brush were recently found on cervical cells. Furthermore, the difference between adhesion of micron silica beads to cancer and normal cervical cells was reported. Thus, some differences in the HarmoniX images might look to be expected. However, the results described in these examples turned out to be substantially different from the expectations. First, there was no significant difference found in the regular (topographical) images of the cell surface. Secondly, a parameter characterizing the surface, fractal dimensionality of adhesion maps showed a substantial 100% difference as measured on cells derived from 12 human subjects.

Algorithm Example 2

It is conceivable to expect that the algorithm described in example 1 may not be sufficient for other types of cancer or when tested against a larger number of human subjects. Here we demonstrate another example which is a more sophisticated algorithm, which gives higher accuracy. Besides the fractal dimensionality, three more parameters will be used in these algorithms. These are:

Parameter 1. The Surfaces Area Ratio ("Sdr") expresses the increment of the interfacial surface area relative to the area of the projected (flat) x, y plane:

$$S_{sd} = \frac{\left(\sum_{k=0}^{M-2}\sum_{l=0}^{N-2} A_{kl}\right) - (M-1)(N-1)\delta x \delta y}{(M-1)(N-1)\delta x \delta y} 100\%, \quad \text{(equation 2)}$$

where $A_{kl}$ is defined as:

$$A_{kl} = \frac{1}{4}\left(\begin{array}{c}\sqrt{\delta y^2 + (z(x_k, y_l) - z(x_k, y_{l+1}))^2} + \\ \sqrt{\delta y^2 + (z(x_{k+1}, y_l) - z(x_{k+1}, y_{l+1}))^2}\end{array}\right)$$

$$\left(\begin{array}{c}\sqrt{\delta y^2 + (z(x_k, y_l) - z(x_{k+1}, y_l))^2} + \\ \sqrt{\delta y^2 + (z(x_k, y_{l+1}) - z(x_{k+1}, y_{l+1}))^2}\end{array}\right).$$

For a totally flat surface, the surface area and the area of the xy plane are the same and Sdr=0%.

Parameter 2. The Root Mean Square Gradient ("Sdq") is the RMS-value of the surface slope within the sampling area, and is defined as:

$$S_{dq} = \sqrt{\frac{1}{(M-1)(N-1)}\sum_{k=0}^{M-1}\sum_{l=0}^{N-1}\left(\frac{z(x_k, y_l) - z(x_{k-1}, y_l)}{\delta x}\right)^2 + \left(\frac{z(x_k, y_l) - z(x_k, y_{l-1})}{\delta y}\right)^2} \quad \text{(equation 3)}$$

Parameter 3. Reduced Summit Height ("Spk") Parameters associated with the two-dimensional DIN 4776 standard are also calculated based on the bearing area ratio curve. First, draw the least mean squares line fitted to the 40% segment of the curve that results in the lowest decline, see figure below. Extend this line so that it cuts the vertical axes for 0% and 100% and draw horizontal lines at the intersection points. Then draw a straight line that starts at the intersection point between the bearing area ratio curve and the upper horizontal line, and end on the 0% axis, so that the area of this triangle is the same as the area between the horizontal line and the bearing area ratio curve. Using the same principle, draw a line between the lower horizontal line and the 100% axis. The Reduced Summit Height is the height of the upper left triangle.

The analysis of the cells prepared as described above give the distribution of the parameters shown in FIG. 7. One can see that there is no unambiguous detection of cancer based on just one parameter (note that the fractal dimensionality ("Sfd") is defined here on the full scale of reciprocal space—compared to the fractal dimensionality of Algorithm Example 1 defined on 3-25 μm$^{-1}$ reciprocal space range).

The examples of the algorithms together with the accuracy and percentage of false-positive detection of cancer are as follows. The cell is cancerous if one of a specific set out of four parameters (Sdq, Sdr, Spk, Sfd) belongs to a specific region shown in the tables below. There are two examples shown. One gives the accuracy of cancer detection of 95% and the other 100%. The amount of false-positives (normal cells identified as cancerous) is shown in the last column.

Algorithms in One-Dimensional Parameter Space.

The cell is cancerous if one each of four parameters (Sdq, Sdr, Spk, Sfd) belongs to a specific range shown in TABLE 1.

TABLE 1

| 1 parameter | Sdq | Sdr | Spk | Sfd | Cancer, % | Normal, % |
|---|---|---|---|---|---|---|
| 95 | 0.15-0.40 | | | | 95.5 | 15.6 |
| | | 1.13-8.00 | | | 95.5 | 13.7 |
| | | | 4.94-20.00 | | 95.5 | 0 |
| | | | | 2.38-2.60 | 95.5 | 3.9 |
| 100 | 0.14-0.40 | | | | 100 | 37.2 |
| | | 1.05-8.00 | | | 100 | 23.5 |
| | | | 4.78-20.00 | | 100 | 1.9 |
| | | | | 2.35-2.60 | 100 | 11.7 |

Algorithms in Two-Dimensional Parameter Space.

The cell is cancerous if one of a specific set of two out of four parameters (Sdq, Sdr, Spk, Sfd) belongs to a specific region shown in TABLE 2.

TABLE 2

| 2 parameter | Sdq | Sdr | Spk | Sfd | Cancer, % | Normal, % |
|---|---|---|---|---|---|---|
| 95 | 0.15-0.40 | 1.13-8.00 | | | 95.5 | 13.7 |
| | 0.14-0.40 | | 4.94-20.00 | | 95.5 | 0 |
| | 0.14-0.40 | | | 2.38-2.60 | 95.5 | 1.9 |
| | | 1.05-8.00 | 4.94-20.00 | | 95.5 | 0 |
| | | 1.05-8.00 | | 2.38-2.60 | 95.5 | 1.9 |
| | | | 4.78-20.00 | 2.38-2.60 | 95.5 | 0 |
| 100 | 0.14-0.40 | 1.05-8.00 | | | 100 | 23.5 |
| | 0.14-0.40 | | 4.78-20.00 | | 100 | 1.9 |
| | 0.14-0.40 | | | 2.35-2.60 | 100 | 3.9 |
| | | 1.05-8.00 | 4.78-20.00 | | 100 | 0 |
| | | 1.05-8.00 | | 2.35-2.60 | 100 | 1.9 |
| | | | 4.78-20.00 | 2.35-2.60 | 100 | 1.9 |

Algorithms in Three-Dimensional Parameter Space.

The cell is cancerous if one of a specific set of three out of four parameters (Sdq, Sdr, Spk, Sfd) belongs to a specific region shown in TABLE 3.

TABLE 3

| 3 parameter | Sdq | Sdr | Spk | Sfd | Cancer, % | Normal, % |
|---|---|---|---|---|---|---|
| 95 | 0.14-0.40 | 1.05-8.00 | 4.94-20.00 | | 95.5 | 0 |
| | 0.14-0.40 | 1.05-8.00 | | 2.38-2.60 | 95.5 | 1.9 |
| | 0.14-0.40 | | 4.78-20.00 | 2.38-2.60 | 95.5 | 0 |
| | | 1.05-8.00 | 4.78-20.00 | 2.38-2.60 | 95.5 | 0 |
| 100 | 0.14-0.40 | 1.05-8.00 | 4.78-20.00 | | 100 | 0 |
| | 0.14-0.40 | 1.05-8.00 | | 2.35-2.60 | 100 | 1.9 |
| | 0.14-0.40 | | 4.78-20.00 | 2.35-2.60 | 100 | 1.9 |
| | | 1.05-8.00 | 4.78-20.00 | 2.35-2.60 | 100 | 0 |

Algorithms in Four-Dimensional Parameter Space.

The cell is cancerous if one of a specific set of four out of four parameters (Sdq, Sdr, Spk, Sfd) belongs to a specific region shown in TABLE 4.

TABLE 4

| 4 parameters | Sdq | Sdr | Spk | Sfd | Cancer, % | Normal, % |
|---|---|---|---|---|---|---|
| 95 | 0.14-0.40 | 1.05-8 | 4.78-20 | 2.38-2.60 | 95.5 | 0 |
| 100 | 0.14-0.40 | 1.05-8 | 4.78-20 | 2.35-2.60 | 100 | 0 |

Highlighted in bold in TABLES 1-4 are the cases when a specific algorithm gives 100% accuracy of cancer detection and zero false positives. Those ranges exampled the minimum volume of the surface parameter space which covers 100% of cancer cells. The said minimum volume may be described by a mathematical equation Φ(surface parameters list)=0, where Φ is a mathematical function defining the surface boundary of the minimum volume in the space of the surface parameters.

Example 4

Finding the Predefined Scan Parameters, Examples of Load Force and the Predefined Humidity of the Scanning Environment/the Time of Scanning at that Humidity Here is demonstrated an example of finding the predefined parameters of the AFM scanning. A particular example below is about the finding of the predefined ranges for the scanning load force and predefined humidity of the scanning environment/the time of scanning at that humidity. All other scanning parameters (known to one skilled in art) can be identified in a similar way as described in the Description of Preferred Embodiments.

When scanning with HarmoniX mode, the predefined load force can be determined as the scanning peak force. The same parts of cancer cells were scanned with different scanning peak forces. FIG. 8a shows the dependence of the peak scanning force on the voltage applied on the AFM probe holder, the parameter used in the AFM software. The force value starts from ~20 nN and reaches its saturation at ~105 nN. (Note that the starting peak force of 20 nN is the force when HarmoniX force curve can be clearly resolved.) One can see in FIG. 8b that the fractal dimensionality, which was calculated on the maps collected with corresponding peak forces, is practically independent of the scanning force. The standard deviation, the error which limits the accuracy of calculated fractal dimensionality is ~0.01. This is sufficient to keep the accuracy of the present algorithm close to hundred percent. If one considers an algorithm to separate cancer cells and normal based on the fractal dimensionality (described in Algorithm Example 1), to preserve the accuracy of the method and the level of hundred percent, the fractal dimensionality should not change more than the difference between cancerous and normal cells (which is ~0.05). As one can define from the data of FIG. 8b, this accuracy can be reached when the load forces are in the range of 30-70 nN (marked by the dashed lines in FIG. 8b). Thus, the predefined load force is 30-70 nN.

Another informative example is the definition of predefined humidity of the scanning environment/the time of scanning at that humidity. This will be defined for the case of the measurement of the fractal dimensionality surface parameter. It is plausible to expect that a high humidity will change fractal dimensionality of the adhesion maps of cells due to moisture condensation on the surface, and consequently, the change of the capillary forces acting between the probe and cell surface. While adsorbed water definitely plays an important role in the observed adhesion, the fractal dimensionality did not change noticeably when imaging was done in summer time (relative humidity ~60%) and winter time (~30%). However, when the relative humidity of air in the lab (in the scanning environment around the cells) exceeded ~70%, a noticeable decrease in the fractal dimensionality during scanning was observed. The samples were taken from a desiccator, where they were stored, and placed under the AFM scanner. Both normal and cancer cells showed the decrease of the fractal dimensionality with time (of the order of several hours after taking the sample out of desiccator). For example, the change of fractal dimensionality with time in ambient conditions with 75 to 80% humidity is shown in FIG. 9. The same cancer cells were measured with 25-30 minutes interval. One can see the fractal dimensionality value changes from ~2.5 in the beginning of experiment to ~2.27 for the time more than 3 hours. If one considers an algorithm to separate cancer cells and normal based on the fractal dimensionality (described in Algorithm Example 1), to preserve the accuracy of the method and the level of hundred percent, the fractal dimensionality should not change more than the difference between cancerous and normal cells (which is ~0.05). Therefore, to preserve the accuracy of the said algorithm, the predefined humidity should be less than 75 to 80% and time of scanning in such requirement (after the cells were extracted from the desiccator or any other dryer) is less than ~160 minutes. In the humidity is lower the time of scanning will be longer.

DEFINITIONS

Unless otherwise defined, all technical and scientific terms used herein have the same meaning as commonly understood by one of ordinary skill in the art to which this invention belongs. In case of conflict, the present specification, including definitions, will control.

The terms "first" or "one," and the phrases "at least a first" or "at least one," are intended to mean the singular or the plural unless it is clear from the intrinsic text of this document that it is meant otherwise. Unless expressly stated to the contrary in the intrinsic text of this document, the term "or" is intended to mean an inclusive "or" and not an exclusive "or." Specifically, a condition A or B is satisfied by anyone of the following: A is true (or present) and B is false (or not present), A is false (or not present) and B is true (or present), and both A and B are true (or present). The terms "a" or "an" are employed for grammatical style and merely for convenience.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements. Sub generic embodiments of the invention are delineated by the appended independent claims and their equivalents. Specific embodiments of the invention are differentiated by the appended dependent claims and their equivalents.

What is claimed is:

1. A method for the analysis of a cell collected from a patient, the method comprising the steps of:
    preparing said cell for atomic force microscopy imaging by freeze-drying, vacuum drying, or subcritical concentration-drying said cell;
    collecting a plurality of images of the surface of said prepared cell using an atomic force microscope, wherein at least one of said plurality of images is a map of adhesion of an atomic force microscope probe to the surface of the cell;
    processing said collected at least one image using an algorithm, wherein the algorithm calculates at least one surface parameter of the imaged cell characterized from the plurality of collected images of the surface of the prepared cell, and further wherein the algorithm utilizes the fractal dimensionality of the map of adhesion of the prepared cell; and
    determining whether said prepared cell is a cancerous cell or a non-cancerous cell based on the results of said algorithm, wherein said prepared cell is determined to be a cancerous cell if said calculated at least one surface parameter falls within a predefined range of surface parameters.

2. The method of claim 1, wherein said cell is collected from a human patient.

3. The method of claim 2, wherein said cell is collected using a Papanicolaou ("Pap") smear test.

4. The method of claim 2, wherein said cell is collected using a liquid cytology test.

5. The method of claim 1, wherein said cell is collected from the patient's blood.

6. The method of claim 1, wherein said cell is collected from the patient's lung.

7. The method of claim 1, wherein said cell is collected from a tissue biopsy.

8. The method of claim 1, wherein the step of preparing said cell for atomic force microscopy imaging comprises the step of:
    fixing said cell prior to drying said fixed cell.

9. The method of claim 8, wherein said step of fixing said cell comprises chemical fixation of said cell.

10. The method of claim 9, wherein said chemical fixation comprises a fixative solution, said fixative solution selected from the group consisting of formaldehyde, paraformaldehyde, glutaraldehyde, Karnovsky's fixative solution, and combinations thereof.

11. The method of claim 1, wherein a plurality of images of said prepared cell are collected, and further wherein at least one of said plurality of images is selected from the group consisting of a topology image, a rigidity image, a stiffness image, a peak force image, and dissipation energy information.

12. The method of claim 1, wherein said atomic force microscope operates in a first mode when said at least one image is collected, said first mode selected from the group consisting of HarmoniX mode, PeakForce mode (Peak Force Tapping), PulseForce mode, and combinations thereof.

13. The method of claim 1, wherein said at least one image is collected over an area of the cell comprising $10\times10$ $\mu m^2$, and further wherein said at least one image comprises a resolution of $512\times512$ pixels.

14. The method of claim 1, wherein said algorithm uses a portion of said collected image for processing.

15. The method of claim 1, wherein said at least one surface parameter is chosen from a family of amplitude parameters.

16. The method of claim 15, wherein said amplitude parameters are selected from the group consisting of Sa (Roughness Average), Sq (Root Mean Square), Ssk (Surface Skewness), Sku (Surface Kurtosis), Sz (Peak-Peak), St (Peak-Peak), S10z (Ten Point Height), Sv (Max Valley Depth), Sp (Max Peak Height), Smean (Mean Value), and combinations thereof.

17. The method of claim 1, wherein said at least one surface parameter is chosen from a family of hybrid parameters.

18. The method of claim 17, wherein said hybrid parameters are selected from the group consisting of Ssc (Mean Summit Curvature), Sti (Texture Index), Sdq (Root Mean Square Gradient), Sdq6 (Area Root Mean Square Slope), Sdr (Surface Area Ratio), S2A (Projected Area), S3A (Surface Area), and combinations thereof.

19. The method of claim 1, wherein said at least one surface parameter is chosen from a family of functional parameters.

20. The method of claim 19, wherein said functional parameters are selected from the group consisting of Sbi (Surface Bearing Index), Sci (Core Fluid Retention Index), Svi (Valley Fluid Retention Index), Spk (Reduced Summit Height), Sk (Core Roughness Depth), Svk (Reduced Valley Depth), Sdcl-h (l-h % height intervals of Bearing Curve), and combinations thereof.

21. The method of claim 1, wherein said at least one surface parameter is chosen from a family of spatial parameters.

22. The method of claim 21, wherein said spatial parameters are selected from the group consisting of Sds (Density of Summits), Std (Texture Direction), Stdi (Texture Direction Index), Srw (Dominant Radial Wave Length), Srwi (Radial Wave Index), dShw (Mean Half Wavelength), Sfd (Fractal Dimensionality), Sc120 (Correlation Length at 20%), Sc137 (Correlation Length at 37%), Str20 (Texture Aspect Ratio at 20%), Str37 (Texture Aspect Ratio at 37%), and combinations thereof.

23. The method of claim 1, wherein said algorithm further uses one or more additional surface parameters of the imaged cell calculated for said collected image.

24. The method of claim 1, wherein said prepared cell image is collected using a set of predefined scanning parameters.

25. The method of claim 24, wherein said predefined scanning parameter is determined based on a predefined required accuracy of a set of surface parameters, said predefined required accuracy determined by said algorithm.

26. The method of claim 1, wherein said fractal dimensionality is calculated by a Fourier transformation.

27. The method of claim 26, wherein said fractal dimensionality is calculated for a reciprocal range of 3-25 $\mu m^{-1}$.

28. The method of claim 27, wherein said cell is determined to be a cancerous cell if said calculated fractal dimensionality is higher than 2.29.

29. The method of claim 27, wherein said cell is determined to be a normal cell if said calculated fractal dimensionality is less than 2.25.

30. The method of claim 1, wherein said surface parameter is selected from the group consisting of Sfd (Fractal dimensionality), Sdr (Surface Area Ratio), Sdq (Root Mean Square Gradient), Spk (Reduced Summit Height), and combinations thereof.

31. The method of claim 1, wherein said at least one surface parameter comprises Sdr (Surface Area Ratio) and Spk (Reduced Summit Height), said surface parameters calculated on said map of adhesion of said prepared cell.

32. The method of claim 31, wherein said prepared cell is determined to be a cancerous cell if said calculated surface parameters belong to a first volume, said first volume defined by Sdr greater than 1.05 and less than 8.00, and Spk greater than 4.78 and less than 20.00.

33. The method of claim 1, wherein said at least one surface parameter comprises Sdq (Root Mean Square Gradient), Sdr (Surface Area Ratio), and Spk (Reduced Summit Height), said surface parameters calculated on said map of adhesion of said prepared cell.

34. The method of claim 33, wherein said prepared cell is determined to be a cancerous cell if said calculated parameters belong to a first volume, said first volume defined by Sdq greater than 0.14 and less than 0.40, Sdr greater than 1.05 and less than 8.00, and Spk greater than 4.78 and less than 20.00.

35. The method of claim 1, wherein said at least one surface parameter comprises Sdr (Surface Area Ratio), Spk (Reduced Summit Height), and Sfd (Fractal dimensionality), said surface parameters calculated on said map of adhesion of said prepared cell.

36. The method of claim 35, wherein said prepared cell is determined to be a cancerous cell if said calculated parameters belong to a first volume, said first volume defined by Sdr greater than 1.05 and less than 8.00, Spk greater than 4.78 and less than 20.00, and Sfd greater than 2.35 and less than 2.60.

37. The method of claim 1, wherein said at least one surface parameter comprises Sdq (Root Mean Square Gradient), Sdr (Surface Area Ratio), Spk (Reduced Summit Height), and Sfd (Fractal dimensionality), said set of surface parameters calculated on said map of adhesion of said prepared cell.

38. The method of claim 37, wherein said prepared cell is determined to be a cancerous cell if said calculated parameters belong to a first volume, said first volume defined by Sdq greater than 0.14 and less than 0.40, Sdr greater than 1.05 and less than 8.00, Spk greater than 4.78 and less than 20.00, and Sfd greater than 2.35 and less than 2.60.

* * * * *